United States Patent
Chaudhry et al.

(10) Patent No.: US 12,003,507 B2
(45) Date of Patent: Jun. 4, 2024

(54) SYSTEM AND METHOD FOR AUTHENTICATION ENABLING BOT

(71) Applicant: Jio Platforms Limited, Ahmedabad (IN)

(72) Inventors: Arijay Chaudhry, Maharashtra (IN); Abhishek Farkade, Maharashtra (IN); Ravindra Chhabra, Maharashtra (IN); Gaurav Duggal, Telangana (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 276 days.

(21) Appl. No.: 17/684,250

(22) Filed: Mar. 1, 2022

(65) Prior Publication Data
US 2022/0278983 A1     Sep. 1, 2022

(30) Foreign Application Priority Data

Mar. 1, 2021  (IN) .............................. 202121008428

(51) Int. Cl.
  *H04L 29/06*   (2006.01)
  *G06F 21/45*   (2013.01)
  *H04L 9/40*    (2022.01)
(52) U.S. Cl.
  CPC .......... *H04L 63/0861* (2013.01); *G06F 21/45* (2013.01); *G06F 2221/2117* (2013.01)
(58) Field of Classification Search
  CPC ... H04L 63/0861; H04L 63/083; G06F 21/45; G06F 2221/2117; G06F 21/32; G06F 21/31
  See application file for complete search history.

(56) References Cited

U.S. PATENT DOCUMENTS

| | | | |
|---|---|---|---|
| 11,090,564 B1* | 8/2021 | Teng ..................... | A63F 13/212 |
| 11,782,986 B2* | 10/2023 | Mehta .................. | G06F 16/901 |
| | | | 707/769 |
| 2019/0140833 A1* | 5/2019 | Grajek ................... | G06F 21/32 |
| 2020/0193009 A1* | 6/2020 | Shafet ................... | G06F 16/332 |

(Continued)

FOREIGN PATENT DOCUMENTS

| | | | | |
|---|---|---|---|---|
| CN | 105118257 A | * | 12/2015 | |
| EP | 4105845 A1 | * | 12/2022 | ............... G06N 3/09 |

OTHER PUBLICATIONS

Acien, Alejandro, et al. "Becaptcha: Bot detection in smartphone interaction using touchscreen biometrics and mobile sensors." arXiv preprint arXiv:2005.13655 (2020). (Year: 2020).*

(Continued)

*Primary Examiner* — Shawnchoy Rahman
(74) *Attorney, Agent, or Firm* — FINNEGAN, HENDERSON, FARABOW, GARRETT & DUNNER, LLP

(57) ABSTRACT

The present disclosure relates to a system and method for enabling authentication on the bot application. The system may receive video stream along with query from a user computing device associated with a user. The query may be a generic or a privileged query and based on the nature of query, identification and verification of the user is carried out. For privileged services, the authentication procedure may include many levels of authentication processes that may include biometric authentication modules as well. Once the user is verified and authenticated, the response for the user query is provided to the user.

26 Claims, 10 Drawing Sheets

(56) References Cited

U.S. PATENT DOCUMENTS

2021/0192412 A1* 6/2021 Krishnaswamy .............................
G06Q 10/06375
2022/0067349 A1* 3/2022 Kuan ..................... G06V 10/82

OTHER PUBLICATIONS

Praseetha, V.M., Bayezeed, Saad and Vadivel, S.. "Secure Fingerprint Authentication Using Deep Learning and Minutiae Verification" Journal of Intelligent Systems, vol. 29, No. 1, 2020, pp. 1379-1387. https://doi.org/10.1515/jisys-2018-0289 (Year: 2020).*
Wei, Ang, Yuxuan Zhao, and Zhongmin Cai. "A deep learning approach to web bot detection using mouse behavioral biometrics." Biometric Recognition: 14th Chinese Conference, CCBR 2019, Zhuzhou, China, Oct. 12-13, 2019, Proceedings 14. Springer International Publishing, 2019. (Year: 2019).*

* cited by examiner

SYSTEM AND METHOD FOR AUTHENTICATION ENABLING BOT

FIELD OF INVENTION

The embodiments of the present disclosure generally relate to facilitating authentication of users for generation of response to a user query. More particularly, the present disclosure relates to a system and method for facilitating biometric authentication of a user query for a category of service for a user based on a machine learning based architecture where authentication could be upgraded or downgraded based on the user query and user equipment.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Authentication systems are the protective barrier for most systems. It makes sure that right people enter the system and access the right information. For example, User A only has access to relevant information and cannot see the sensitive information of User B.

Passwords are the most common methods of authentication. Passwords can be in the form of a string of letters, numbers, or special characters. However, passwords are prone to phishing attacks and bad hygiene that weakens effectiveness. An average person has about 25 different online accounts, but only 54% of users use different passwords across their accounts. The truth is that there are a lot of passwords to remember. As a result, many people choose convenience over security. Most people use simple passwords instead of creating reliable passwords because they are easier to remember. The bottom line is that passwords have a lot of weaknesses and are not sufficient in protecting online information. Hackers can easily guess user credentials by running through all possible combinations until they find a match. Whereas, Multi-Factor Authentication (MFA) is an authentication method that requires two or more independent ways to identify a user. Examples include codes generated from the user's smartphone, Captcha tests, fingerprints, or facial recognition. MFA authentication methods and technologies increase the confidence of users by adding multiple layers of security. MFA may be a good defense against most account hacks, but it has its own pitfalls. People may lose their phones or SIM cards and not be able to generate an authentication code.

Further, certificate-based authentication technologies identify users, machines or devices by using digital certificates. The certificate contains the digital identity of a user including a public key, and the digital signature of a certification authority. Users provide their digital certificates when they sign in to a server. The server verifies the credibility of the digital signature and the certificate authority. The server then uses cryptography to confirm that the user has a correct private key associated with the certificate. Token-based authentication technologies enable users to enter their credentials once and receive a unique encrypted string of random characters in exchange.

While, biometrics authentication is a security process that relies on the unique biological characteristics of an individual. Biological characteristics can be easily compared to authorized features saved in a database. Common biometric authentication methods include: Facial recognition matches the different face characteristics of an individual trying to gain access to an approved face stored in a database. Face recognition can be inconsistent when comparing faces at different angles or comparing people who look similar, like close relatives. Fingerprint scanners match the unique patterns on an individual's fingerprints. Some new versions of fingerprint scanners can even assess the vascular patterns in people's fingers. Voice identification examines a speaker's speech patterns for the formation of specific shapes and sound qualities. A voice-protected device usually relies on standardized words to identify users, just like a password. Eye scanners include technologies like iris recognition and retina scanners. Iris scanners project a bright light towards the eye and search for unique patterns in the colored ring around the pupil of the eye. The patterns are then compared to approved information stored in a database. Eye-based authentication may suffer inaccuracies if a person wears glasses or contact lenses. Biometric authentication traditionally are mostly used to control physical access when installed on gates and doors.

In the last few decades, entities/organizations have been marketing their products by online means wherein there exists a facility for the users/customers to do an online textual chat with a bot for getting text based responses for various queries that any user may have about products/operational services provided by such entities. But, such online means can be easily hacked by the existing authentication technologies. Even a video based response such as a video recording that may pictorially demonstrate the relevant information related to the user query can be easily hacked. Even though, many diverse forms of authentication processes are present, much to the chagrin of the security community, passwords have stubbornly remained the only authentication mechanism in place for the vast majority of user accounts. This is largely due to the simplicity and ease of use that passwords provide account holders.

Also, existing authentication techniques cannot be customised. Moreover, existing personalised bot interaction cannot provide sensitive personalized information like financial and medical records with additional features of accuracy, quick response and fraud-free operations while sharing or receiving any sensitive information, the technology offers a staggered level of security for compliance before any transaction can be initiated. Even if the existing bots are able to provide some amount of personalised sensitive information, users often need to travel to respective centres to undertake transactions particularly in cases where personal presence is required to prevent frauds. The existing bots are also not customer friendly, easy to interact with and further do not provide accurate and timely interaction with the customer while securing and authenticating the users. For example, customers may want to know their banking transaction details, credit card details, profile related details, and the without any danger of their sensitive information being compromised and hence always may prefer to visit their respective banks. Without a good authentication technique, customers may not want to get or send their sensitive personalized information as well as get any queries/requirements resolved on existing bot interaction itself without visiting the branch or calling the customer care.

There is, therefore, a need in the art to provide a system and a method that can allow an interactive bot as effective tool not only to answer generic queries by displaying graphics, images, textual messages, audios and videos on the bot through which the user could get resolution to his/her requirements but also for customized queries to configure various call-to-actions on the bot with enhanced authentication features to provide accuracy and security to enable sharing personalized and customized information to the users.

OBJECTS OF THE PRESENT DISCLOSURE

Some of the objects of the present disclosure, which at least one embodiment herein satisfies are as listed herein below.

It is an object of the present disclosure to provide a system and a method for facilitating enhanced authentication features to provide accuracy and security to enable sharing personalized and customized information to the users.

It is an object of the present disclosure to provide a system and a method for reducing or eliminating the need for users to physically visit an entity in order to complete a transaction.

It is an object of the present disclosure to provide a system and a method for facilitating secure exchange of sensitive information.

It is an object of the present disclosure to provide a system and a method for ensuring fraud free operations.

It is an object of the present disclosure to provide an approach for validating identity of the user and ensure cost effective services to address user needs by a simple authenticating but proactive infrastructure.

It is an object of the present disclosure to provide a system and a method that facilitates an interactive bot as effective tool to answer generic queries by displaying graphics, images, textual messages, audios and videos on the bot through which the user could get resolution to his/her requirements.

It is an object of the present disclosure to provide a system and method for customized queries to configure various call-to-actions on the bot.

It is an object of the present disclosure to provide with enhanced authentication features to provide accuracy and security to enable sharing personalized and sensitive information to the users.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for facilitating authentication on the bot application. In an aspect, the system for authentication on the bot application may include a processor that executes a set of executable instructions stored in a memory, upon execution of which, the processor causes the system to receive a first set of data packets that may include a video stream along with query from a user computing device associated with a user. The video stream along with the query may pertain to biometric features of the user, and receive, from a database, a knowledgebase that may include a set of potential identity information associated with the biometric features of the user and a plurality of information services associated with the user and said query. The system also causes the processor to extract a first set of features and a second set of features from the received first set of data packets. The first set of features may be associated with a class of queries associated with the information service and may be extracted by a query extraction engine and a bio-metric collecting engine may extract the second set of features, where the second set of features correspond to biometric features of said user. The system further causes the processor to map, through a machine learning (ML) engine, any or a combination of extracted first and second set of features with said knowledgebase to identify and authenticate the user and the query. Furthermore, the system may cause the processor to generate, through the ML engine, a trained model configured to process the query of the identified and authenticated user, and predict, from the plurality of information services, an information service associated with the identified and authenticated user query, and facilitate response corresponding to the information service to the identified and authenticated user query based on the trained model and then the system may cause the processor to auto-generate, using the ML engine, the response by the bot application to the identified and authenticated user.

In another aspect, the present disclosure includes method for system for authentication on the bot application. The method may be executed by a processor, and includes the steps of: receiving a first set of data packets comprising a video stream along with query from a user computing device associated with a user, the video stream along with the query pertaining to biometric features of the user, and receiving, from a database, a knowledgebase that may include a set of potential identity information associated with the biometric features of the user and a plurality of information services associated with the user and the query. Further, the method may include the step of extracting, by a query extraction engine, a first set of features from the received first set of data packets, the first set of features associated with a class of queries associated with the information service and extracting, by a biometric collecting engine, a second set of features from the received first set of data packets, the second set of features corresponding to biometric features of said user. Furthermore, the method may include the step of mapping, through a machine learning (ML) engine, any or a combination of extracted first and second set of features with said knowledgebase to identify and authenticate the user and the query and generating, through the ML engine, a trained model configured to process said query of said identified and authenticated user, and predict, from said plurality of information services, an information service associated with the identified and authenticated user query, and facilitate response corresponding to the information service to the identified and authenticated user query based on the trained model. The method may also include the step of auto-generating, using the ML engine, the response by the bot application to the identified and authenticated user.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for facilitating authentication on a bot as well as ability to customize responses to any queries that may be asked by users using their devices, wherein the queries may be related to one or more aspects of operational, information services/goods of the entity. The present invention provides for the bot that may allow remote authentication of user for services provided by the entity or organisation using this bot. The present invention thus can enable the user to provide and receive sensitive personal and may eliminate the need to travel by the user to undertake transactions particularly in cases where personal presence is required. The present invention may further enable accurate and timely interaction with the user and ensure fraud free operations.

Figure 1:
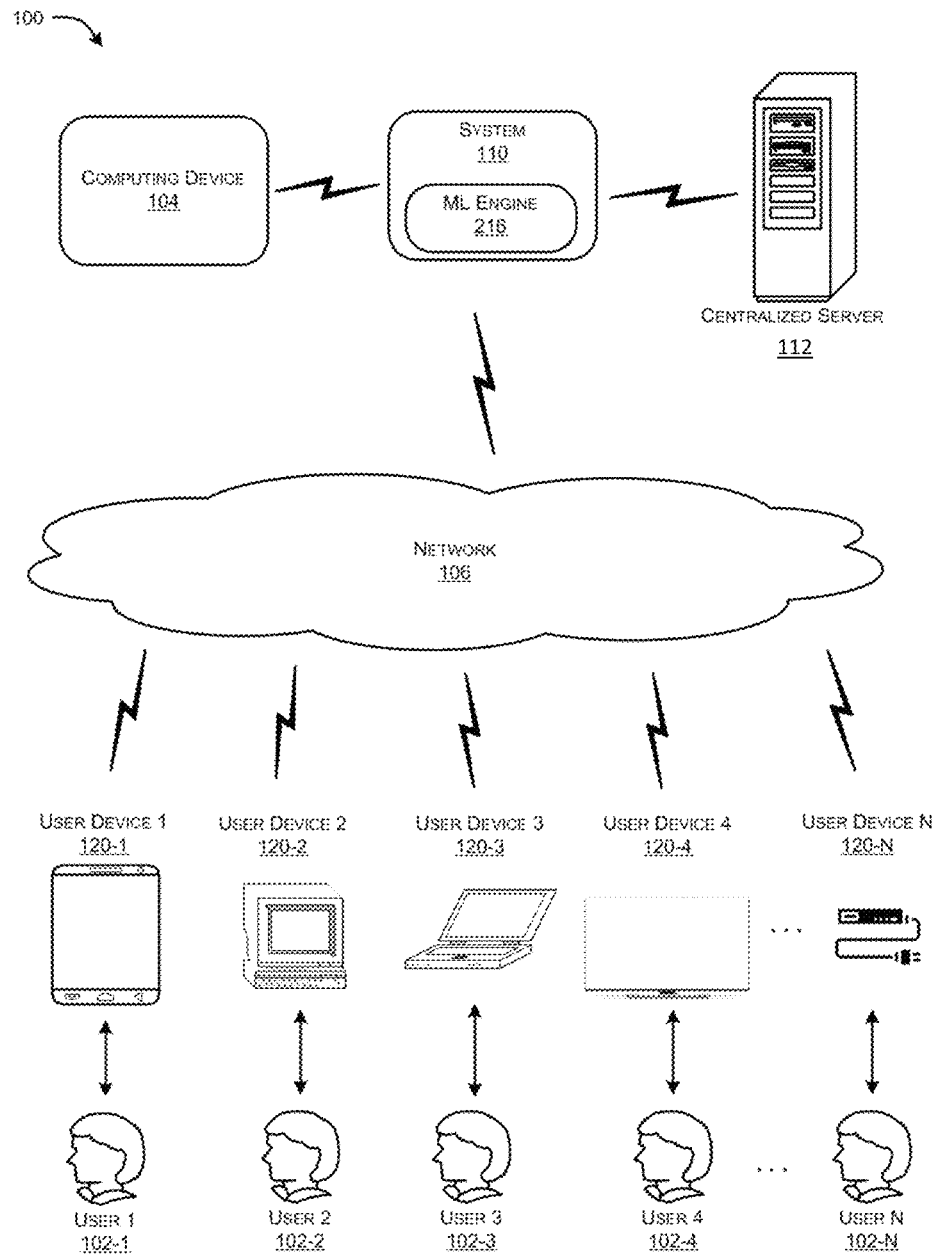
FIG. 1 illustrates an exemplary network architecture in which or with which the system of the present disclosure can be implemented, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example and not limitation, the exemplary architecture (100) may include a plurality of users (102-1, 102-2, . . . 102-n) (hereinafter interchangeably referred as user 102 and collectively referred to as users 102). Each user may be associated with at least one user computing device (120-1, 120-2, . . . 120-n) (hereinafter interchangeably referred as a user device 120 and collectively referred to as user devices 120 or user equipments 120). The users (102) may interact with the system (110) by using their respective user device (120). The user device (120) and the system (110) may communicate with each other over a network (106). The system (110) may be associated with a centralized server (112). Examples of the computing devices (120) can include, but are not limited to a smart phone, a portable computer, a personal digital assistant, a handheld phone, a laptop, a smart TV, a set top box (STB), a mobile phone and the like.

More specifically, the exemplary architecture (100) includes a system (110) equipped with a machine learning (ML) engine (216) for facilitating authentication of the user (102) on the bot that can receive a first set of data packets that may include a video stream along with query from the user computing device (120). The video stream along with the query may pertain to biometric features of the user (102). The system (110) may include a database (210) that may store a knowledgebase having a set of potential identity information associated with the biometric features of the user (102) and a plurality of information services associated with the user (102) and the query generated by the user. The user device (120) may be communicably coupled to the centralized server (110) through the network (106) to facilitate communication therewith. As an example and not by way of limitation, network architecture (100) may include a second computing device (104) (also referred to as computing device hereinafter) associated with an entity (114). The computing device (104) may be operatively coupled to the centralised server (112) through the network (106).

In an embodiment, the system (110)/centralised server (112) may include feature extraction engine (214). The feature extraction engine (214) may be operatively coupled to a query extraction engine and a biometric collection engine. The query extraction engine may be configured to extract a first set of features from the received first set of data packets, where the first set of features may be associated with a class of queries pertaining to an information service, while the biometric collection engine may be configured to extract a second set of features from the received first set of data packets, where the second set of features may correspond to biometric features of the user. In an embodiment, the ML engine (216) may be then configured to map any or a combination of extracted first and second set of features with said knowledgebase to identify and authenticate the user and the query.

In an embodiment, the system (110)/server (112) may further configure the ML engine (216) to generate, through an appropriately selected machine learning (ML) model of the system in a way of example and not as limitation, a trained model configured to process the query of the identified and authenticated user, and predict, from the plurality of information services, an information service associated with the identified and authenticated user query, and facilitate response corresponding to the information service to the identified and authenticated user query based on the trained model. Generate, through the ML engine, a trained model configured to process said query of said identified and authenticated user, and predict, from said plurality of information services, an information service associated with said identified and authenticated user query, and facilitate response corresponding to said information service to said identified and authenticated user query based on the trained model. The ML engine (216) may be further configured to auto-generate the response by the bot to the identified and authenticated user.

In an embodiment, the class of queries may include a set of queries for information services that may include generic information services and privileged information services.

In another embodiment, as a way of example and not as a limitation, the query of the identified and authenticated user may be received at client side of the executable bot in the form of a second set of data packets from said user device (120). In another embodiment, the response mapped with the information service may be transmitted in real-time in the form of a third set of data packets to said user device (120) from server side of the executable bot.

In an exemplary embodiment, the executable bot may be represented in the form of any or a combination of an animated character, a personality character, an actual representation of a human operator and the like.

In an embodiment, the system may be configured to obtain a registration data based on a request from an unregistered user through respective user device (120). In an exemplary embodiment, the login credentials may be generated based on acknowledgement of the request and verification of the registration data. In another exemplary embodiment, the user (102) may enter the generated login credentials to access the system to obtain the information service associated with the user (102).

In yet another embodiment, the system (110) may store consent of the user to store biometric features of the user (102) for the class of queries for information services that may include privileged information services and upon receipt of the consent of the user the system (110) may store the biometric features of the user. In another embodiment, the biometric features may be stored based on the biometric scanners available in the user computing device (120) associated with the user (102).

In another embodiment, the ML engine (216) may identify and authenticate the user (102) through any or a combination of voice, password, OTP, facial feature, fingerprint, iris, DNA, skin, ear lobe, nose but not limited to these stored in the database. In yet another embodiment the ML engine (216) may be configured to identify whether the query is for generic information services or privileged information services. Further, in another embodiment, the ML engine may check whether the consent of user is available to access the privileged information services. In yet another embodiment, the ML engine (216) may be configured to apply and identify one or more authentication modules based on a predefined set of configuration parameters associated with the plurality of information services corresponding to the query generated by the user (102).

In an exemplary embodiment, the predefined configuration parameters may pertain to the availability of biometric feature extracting and scanning devices coupled to the user device (120) and the class of queries corresponding to generic information services and privileged information services.

In an aspect, the bot application may be generated through any or a combination of IVR, Native Dialler, OTT route and the like.

The ML engine (216) in another embodiment, may be configured to change authentication module based on any or a combination of the query generated by the user (102) and user equipment associated with the respective biometric features. The change in authentication module may correspond to upgradation or down gradation of the authentication module having the biometric features. In an exemplary embodiment, by way of example and not as limitation, if a user may want only generic services from a service provider, such as a query for banking services to know account balance, authentication module may provide only basic authentication process such as asking for passwords, OTPs and the like. In another exemplary embodiment, if the user wants a privileged service, the authentication module may be upgraded to add authentication features such as biometric scan including Iris scan, fingerprint scan, ear lobe scan, facial feature scan and the like. In another embodiment, the authentication module may be downgraded if the user equipment is unable to support biometric scanners for scanning Iris, ear lobe, fingerprint, facial features and the like.

In yet another embodiment, the ML engine may be configured to receive a query in the form of any or a combination of textual message, audio form, video form but not limited to it and the response associated with the information service corresponding to the query received by the ML engine may also be provided in the form of textual message, audio form, video form but not limited to it.

Further, in an embodiment, the ML engine may be configured with language processing engines to receive the query in any language and provide the response corresponding to the query in any language.

In a way of example, but not as a limitation, the query can be in any language such as Hindi, English, Assamese, Bengali, Kannada, French, Korean and the like and the response for the query can be in any language such as Hindi, English, Assamese, Bengali, Kannada, French, Korean and the like.

In an embodiment, the pre-defined responses may be generated by the entity (114) using the computing device (104) based on one or more requirement criteria. The ML engine (216) may be provided an input including the pre-defined queries and the corresponding responses/datasets to enable a learning phase of the ML engine (216). The user (102) may ask a query using his/her user device (120), and based on the user query and intent/category/classification that the query may be processed/mapped to, the system (110) may generate one or more responses. The responses may be provided as video streams.

The system (110) of the present disclosure can enable entity (114) to customize the pre-defined responses in a manner that may best suit the needs of the entity (114) for enhanced awareness of the informational services offered by them. In an embodiment, the pre-defined responses as video streams (input) and the automated responses (output) may include any or a combination of responsive video frames and visual display of information including, but not limited to, graphical data and images that may be informative with respect to the pre-defined query. In an exemplary embodiment, the responsive video frames may be video recording that may be manually recorded using a recording device coupled to the computing device (104) of the entity (114). The recording device can be any or a combination of a camera, a video recorder and the like that may be either inbuilt or externally connected to the computing device (104) of the entity (102). The recording device may further include one or more audio recording accessories connected thereto. In an embodiment, the manual recording may be done based on an authentication of an identity of the entity or one or more operators associated with the entity (102), such that only if the authentication may be positive, the entity or the operator may be allowed to manually record the responsive video frames. Based on positive authentication, the computing device (104) may be communicably coupled via an interface of the system (110) such that bot engine of the system (110) may receive the pre-defined visual responses through an interface of the system (110).

In an embodiment, the requirement criteria for generation of the pre-defined visual/video frame responses can include at least one factor associated with the pre-defined query selected from relevancy of information, theoretical information, information related to the availability of one or more products corresponding to the operational services and a recommendation corresponding to the operational services. In an exemplary embodiment, the entity (114) may desire to generate pre-defined response based on the relevancy of information, wherein the relevancy can depend on the qualitative information that may be essential to explain a particular pre-defined query. The theoretical information may be related to the existing general information in relation to the pre-defined query. The information related to the availability of one or more products correspond to the operational services that may include data which may be specific to the type and variety of products that the entity might be offering. The recommendation corresponding to the operational services may include an opinion or a perspective that may highlight which products may be more suited for a specific set of users. Thus, the present system can enable a wide variety of responses and hence can be far more effective as well as informative.

In accordance with an embodiment and as illustrated in FIG. 1, on the user end, the architecture can enable an user to access information regarding the information services offered by the entity (114) by typing a user query (hereinafter interchangeably referred to as query/queries) on their respective user devices (120) and obtaining a visual response for the user query. In an embodiment, the user can gain access to the system only when he/she has been identified and authorized by the system. In an embodiment, the user may include, but not limited to, an existing customer, a potential customer, a research analyst, or any other person interested to know about the services offered by the entity.

In an embodiment, the computing device (104) and/or the user device (120) may communicate with the system (110) via set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, a smart TV, a Set Top Box (STB) or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server 110 may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
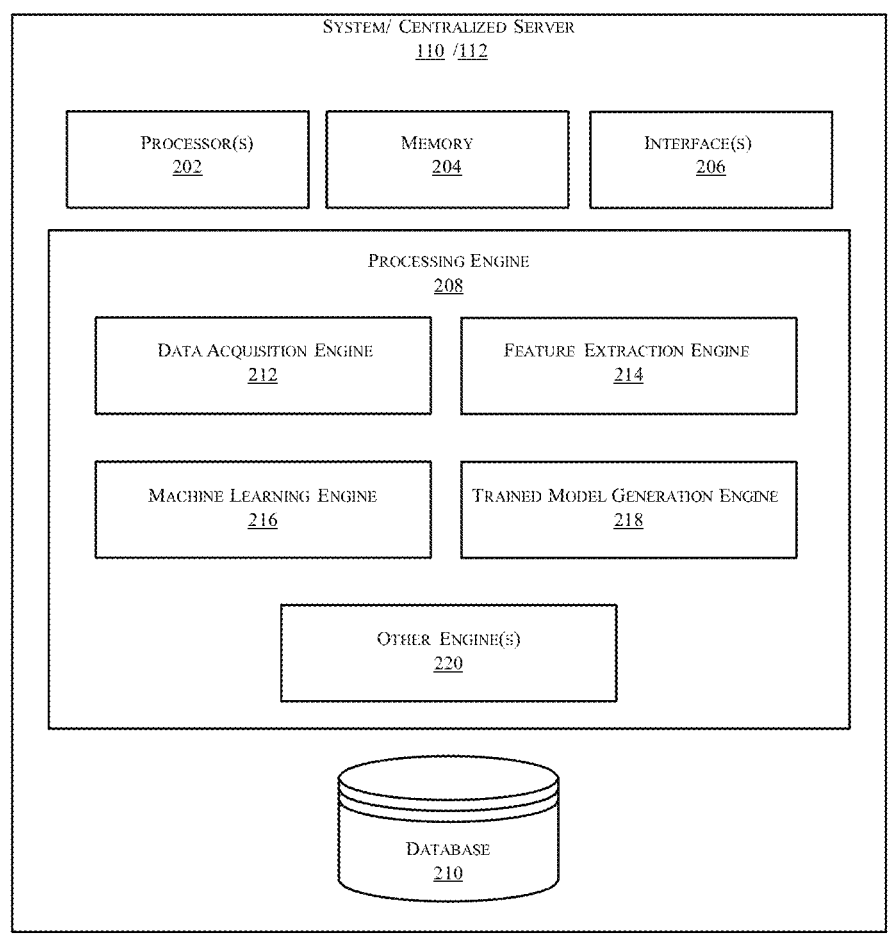
FIG. 2 illustrates an exemplary representation (200) of system (110) or a centralized server (112), in accordance with an embodiment of the present disclosure.

In an embodiment, the system (110) may include one or more processors coupled with a memory, wherein the memory may store instructions which when executed by the one or more processors may cause the system to perform the generation of automated visual responses to a query. FIG. 2 with reference to FIG. 1, illustrates an exemplary representation of system (110)/centralized server (112) for facilitating authorization on the bot through which one or more automated visual responses to a user query are transmitted based on a machine learning based architecture, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the system (110). The interface(s) 204 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition (212), a feature extraction (214), a machine learning (ML) engine (216), and other engines (218). In an embodiment, the data acquisition engine (212) of the system (110) can receive/process/pre-process comprising a video stream along with query from a user computing device (120) associated with a user (102), the video stream along with the query may include biometric features of the user and a knowledgebase (retrieved say from a database or a storage medium (210) including, but not limited to, one or more potential queries that the entity is likely to be asked along with video frame responses to each of the one or more potential queries. Each query may be associated/mapped with an intent/category/classification that may reflect the purpose/intent behind the query. The bot engine also enables generation of plurality of datasets based on one or more pre-defined visual/video frame responses and pre-defined/potential queries received from the computing device (104) of the entity (114). The data acquisition engine (212) can receive pre-defined visual responses from the computing device (104) through an interface of the system and store them in a database (210) based on prestored parameters associated with each pre-defined query.

In an embodiment, the proposed system may include a feature extraction engine (214) configured to extract features associated with the facilitation of authentication of users through the bot. The feature extraction engine (214) may include a query extraction engine that may extract a first set of features pertaining to query generated by the user from the receive first set of data packets. In an exemplary embodiment, the feature extraction engine may also include a biometric feature collection engine that may be configured to extract a second set of features associated with the biometric features of the user. As a way of example, and not as a limitation, the biometric features may include any feature related to facial image, iris, DNA, fingerprint, voice, ear lobe, nose and the like.

In an aspect, the ML engine (216) can be configured to generate, through a machine learning (ML) model of the system, a trained model configured to process the query of the identified and authenticated user, and predict, from the plurality of information services, an information service associated with the identified and authenticated user query, and facilitate response corresponding to the information service to the identified and authenticated user query based on the trained model. generate, through the ML engine, a trained model configured to process said query of said identified and authenticated user, and predict, from said plurality of information services, an information service associated with said identified and authenticated user query, and facilitate response corresponding to said information service to said identified and authenticated user query based on the trained model. The ML engine (216) may be further configured to auto-generate the response by the bot to the identified and authenticated user.

In an aspect, the end-user query can be received at client side of the executable bot application in the form of a first set of data packets from an end user computing device, and wherein the video frame response that is mapped with the predicted intent can be transmitted in real-time in the form of a second set of data packets to said end user computing device from server side of the executable bot application. In another aspect, the client side of the executable bot application can be represented in the form of any or a combination of an animated character, a personality character, or an actual representation of the entity character.

Figure 3:
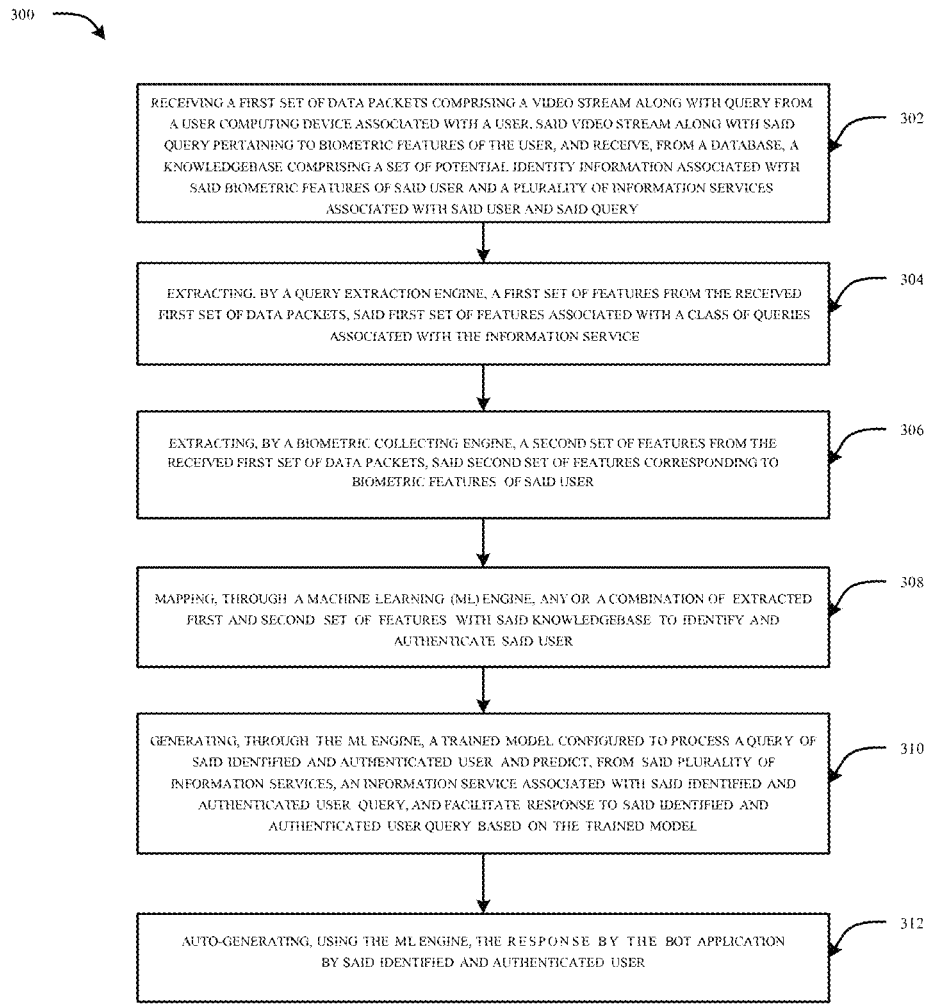
FIG. 3 illustrates exemplary method flow diagram (300) depicting a method for facilitating authorization on the bot application, in accordance with an embodiment of the present disclosure.

FIG. 3 illustrates exemplary method flow diagram (300) depicting a method for facilitating authorization on the bot application, in accordance with an embodiment of the present disclosure.

As illustrated, in an aspect the method may facilitate authorization on the bot through a series of steps. The method may include at 302, the step for receiving a first set of data packets comprising a video stream along with query from a user computing device associated with a user, the video stream along with the query pertaining to biometric features of the user, and receiving, from a database, a knowledgebase that may include a set of potential identity information associated with the biometric features of the user and a plurality of information services associated with the user and the query. Further, the method may include at 304, the step for extracting, by a query extraction engine, a first set of features from the received first set of data packets, the first set of features associated with a class of queries associated with the information service and at 306, a step for extracting, by a biometric collecting engine, a second set of features from the received first set of data packets, the second set of features corresponding to biometric features of said user.

Furthermore, the method may include at 308, the step for mapping, through a machine learning (ML) engine, any or a combination of extracted first and second set of features with said knowledgebase to identify and authenticate the user and the query and at 310, the step for generating, through the ML engine, a trained model configured to process said query of said identified and authenticated user, and predict, from said plurality of information services, an information service associated with the identified and authenticated user query, and facilitate response corresponding to the information service to the identified and authenticated user query based on the trained model. The method may also include at 312 the step for auto-generating, using the ML engine, the response by the bot application to the identified and authenticated user.

Figure 4:
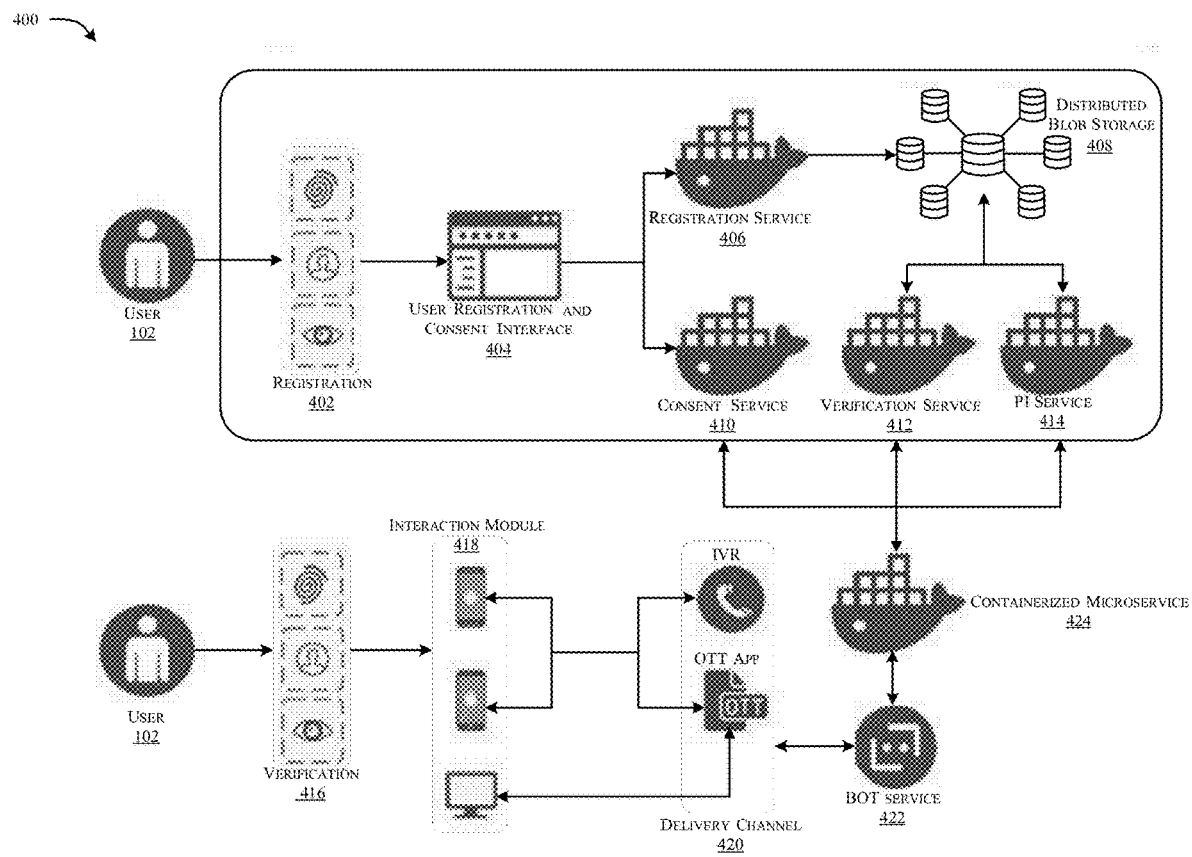
FIG. 4 illustrates an exemplary representation (300) of system architecture and its implementation, in accordance with an embodiment of the present disclosure.

FIG. 4 illustrates an exemplary representation (400) of system architecture and its implementation, in accordance with an embodiment of the present disclosure.

As illustrated, the system architecture may include the registration process and the verification process. The registration process may include user registration (402) of the user (102) through biometric feature identity such as facial identification, finger-print, iris using non-public registration portals. The signed consent of user would also be taken in the registration process through the user registration and consent interface (404) and would be updated in the system. Once registration is completed, the biometric data would be stored in Distributed Blob storage 408. The user (102) may have ability to remove his consent any time. The user registration and consent interface (404) also may include services such as consent service (410), verification service (412) and PI service (414). These services are part of bot service (422).

In an embodiment, the user (102) can be verified by the verification process (416) through scanning biometric features such as facial identification, finger-print, iris and mapping them with the respective biometric features stored in the non-public registration portals. While interacting with the Bot through the interacting module (418), user can query generic information or a privileged information. The Bot service (422) will decide whether the information is generic or privileged. In case of privileged information, the Bot service (422) may check whether the user has given consent to access privileged information through the consent service (410). In case the user has consented then the bot service (422) may check if the device has hardware capability and permission for biometric identification. Depending on the degree of restriction on the information one or more type of biometric verification would be performed. Once the Biometric identification is successful, the privileged information of the user would be presented in the Bot.

Figure 5A:
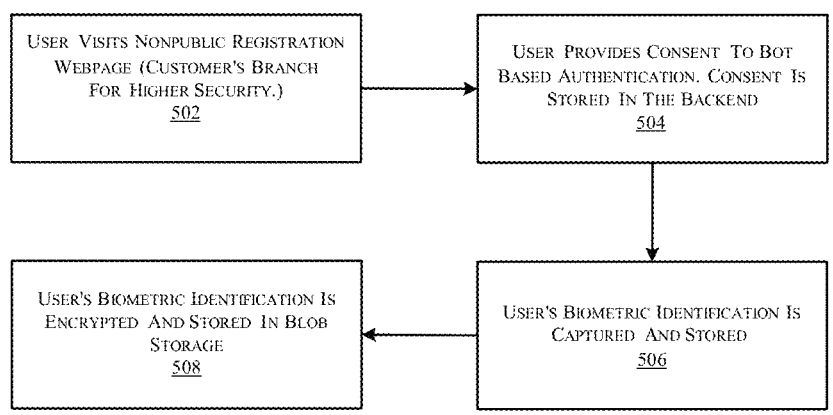
FIGS. 5A and 5B illustrate exemplary flow diagrams representing registration and verification process of a user, in accordance with an embodiment of the present disclosure.
Figure 5B:
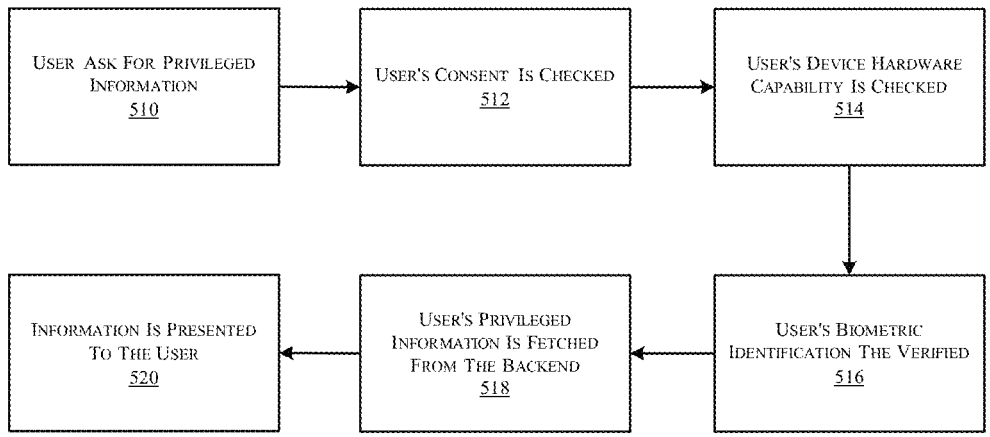

FIGS. 5A and 5B illustrate exemplary flow diagrams representing registration and verification process of a user, in accordance with an embodiment of the present disclosure.

As illustrated, FIG. 5A, shows a flow diagram associated with a registration process of a user. The registration process may include at block 502, User visits non-public Registration Webpage (for example branch of the user for higher security). At block 504, the user provides consent to Bot based authentication and consent is stored in the backend and at block 506, the biometric identification of the user is captured and stored. Then at block 508, the biometric information of the user is encrypted and stored in Blob storage.

In FIG. 5B, the verification process is highlighted by the flow diagram. The verification process may include at block 510, the user asking for privileged information. At block 512, the consent of the user is check. Further, at block 514, the hardware capability of the user is checked after receiving the consent from the user. At block 516, the biometric identification of the user is verified and once verified at block 518 privileged information of the user is fetched from the backend and at block 520, Information is presented to the user.

FIGS. 6A-6J illustrate exemplary interfaces of the bot, in accordance with an embodiment of the present disclosure.

Figure 6A:
FIGS. 6A-6J illustrate exemplary interfaces of the bot, in accordance with an embodiment of the present disclosure.
Figure 6B:
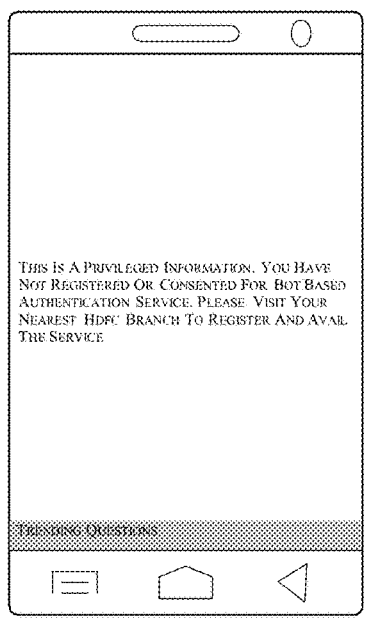

As illustrated in FIG. 6A, the interface shows about a user query for a privileged information where bot service identifies the intent and starts the flow to authenticate user. FIG. 6B shows that the user must be registered and consented to access privileged information and the following error is shown when the user is not registered or consented. FIG. 6B also shows that before querying for the information at backend, the device hardware capability and permission is checked.

Figure 6C:
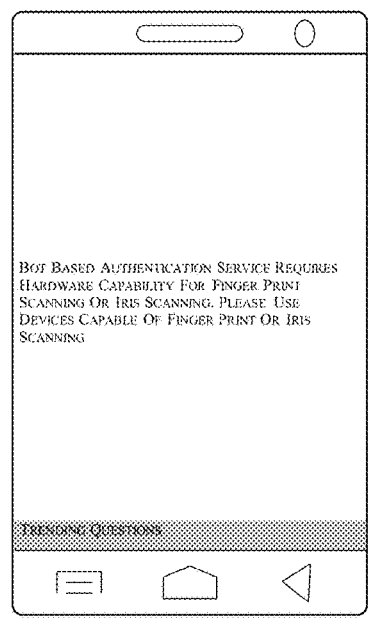
Figure 6D:
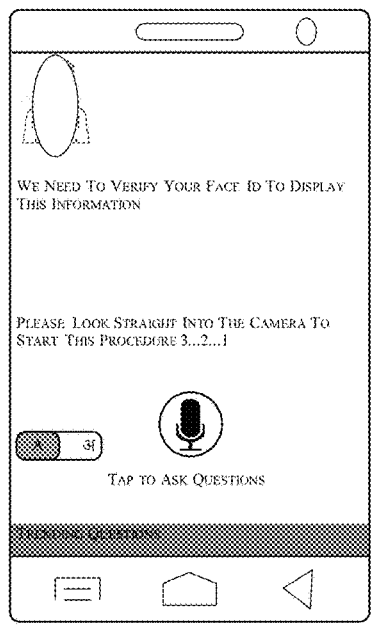
Figure 6E:
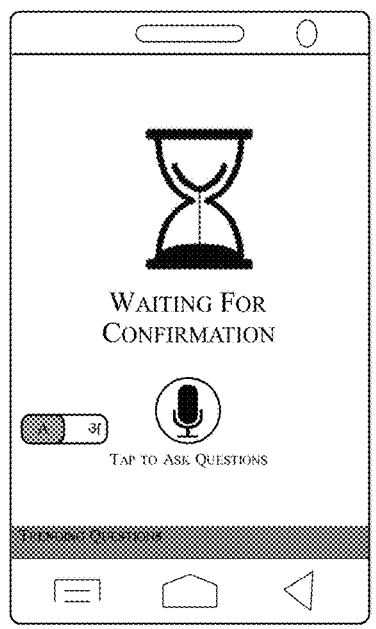
Figure 6F:
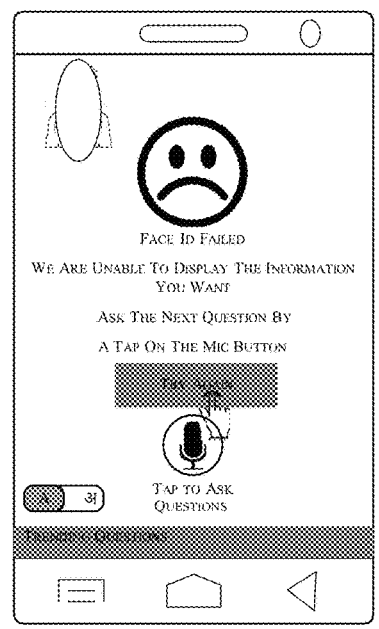

FIG. 6C shows that before querying for the information at backend the device hardware capability and permission is checked while FIG. 6D shows that once the user is connected to the Video Bot, the relevant privileges are checked such as the consent given by the user to share privileged information and post this process a biometric verification would be performed. FIG. 6E shows how the system initiates the correct biometric verification for sharing the relevant privileged information. It waits for a confirmation from the backend servers to complete this process while FIG. 6F illustrates when verification fails through the biometric process, the secure information is not given out to the user/customer and he/she is asked to ask the next question by a tap on the MIC button or simply writing a text.

Figure 6G:
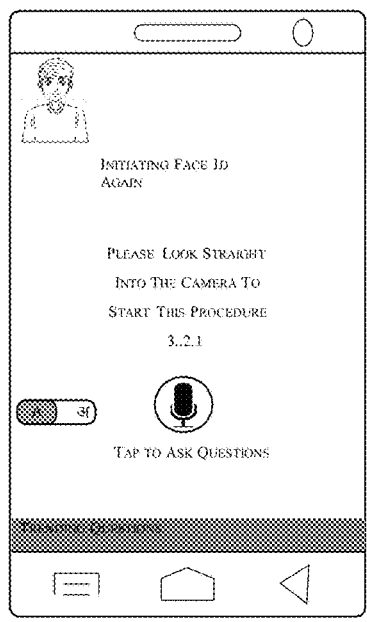
Figure 6H:
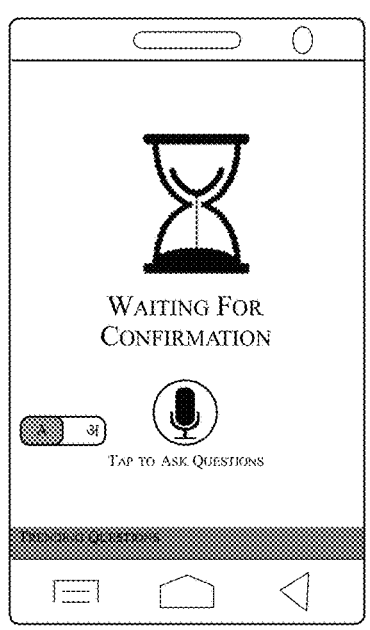
Figure 6I:
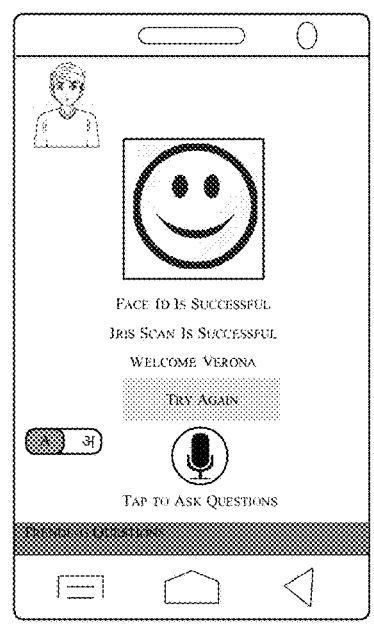
Figure 6J:
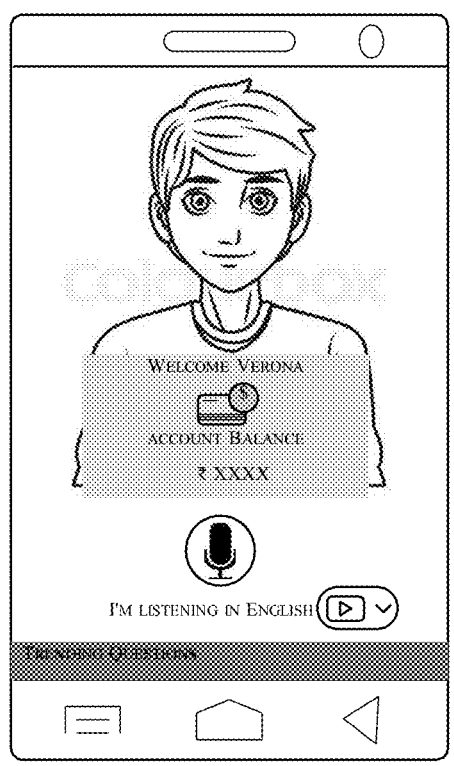

In an exemplary implementation, FIG. 6G shows how if the user asks a query about his/her "bank balance" which is a privileged information, the verification process would be triggered again as shown in the screenshot and FIG. 6H shows the system initiating the correct biometric verification for sharing the relevant privileged information and waiting for a confirmation from the backend servers to complete this process. And in FIG. 6I, by way of an example and not as a limitation, if the Iris scan and Face ID are successful, the user is directed to view his/her privileged information as shown in the screenshot below and FIG. 6J the relevant account balance information for the customer is displayed.

Figure 7:
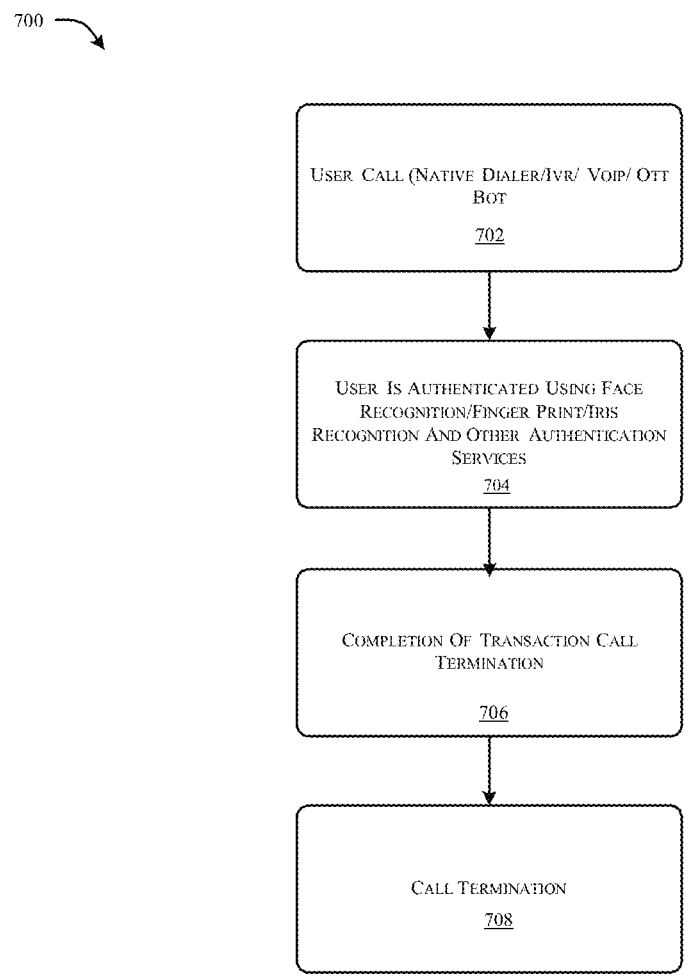
FIG. 7 refers to an exemplary flow diagram representing user interaction with the bot, in accordance with an embodiment of the present disclosure.

FIG. 7 refers to an exemplary flow diagram representing user interaction with the bot, in accordance with an embodiment of the present disclosure.

As illustrated, the user interaction with the bot may include at block 702 user call through native Dialer/IVR/VOIP/OTT BOT. Then at block 704, the user is authenticated using Face Recognition/Finger-Print/Iris Recognition and other authentication services. Further at block 706, completion of transaction takes place and then at block 708, the call is terminated.

In an embodiment, the bot may be invocated through a smart phone, a smart TV, a tablet, a laptop, a set top box (STB) a regular phone, any computing device but not limited to the like.

Thus, the present disclosure provides a unique and inventive solution for identification and authorization of users to access a system for a particular service. The authorization can be for a generic service or for privileged services. The system can enable enhanced authorization and verification modules for accessing privileged services. Further the system may check for the consent of the user and only then provide biometric identification and authorization of the users.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides for a system and a method for facilitating enhanced authentication features to provide accuracy and security to enable sharing personalized and customized information to the users.

The present disclosure provides for a system and a method for reducing or eliminating the need for users to physically visit an entity in order to complete a transaction.

The present disclosure provides for a system and a method for facilitating secure exchange of sensitive information.

The present disclosure provides for a system and a method for ensuring fraud free operations.

The present disclosure provides for a system and a method for validating identity of the user and ensure cost effective services to address user needs by a simple authenticating but proactive infrastructure.

The present disclosure provides for a system and a method that facilitates an interactive bot as effective tool to answer generic and privileged queries by displaying graphics, images, textual messages, audios and videos on the bot through which the user could get resolution to his/her requirements.

The present disclosure provides for a system and a method for customized queries to configure various call-to-actions on the bot.

The present disclosure provides for a system and a method with enhanced authentication features to provide accuracy and security to enable sharing personalized and sensitive information to the users.

The present disclosure provides for a system and a method that facilitates quick and accurate matching of the biometric features with the database resulting in instant user verification.

The present disclosure provides for a system and a method that enables ensuring of any advanced verification is undertaken based on the nature of service requested.

The present disclosure provides for a system and a method that facilitates assurance that registration process, permission on privileges and verification processes are seamlessly integrated to provide optimal user service.

We claim:

1. A system for authentication on the bot application, said system comprising a processor that executes a set of executable instructions that are stored in a memory, upon which execution, the processor causes the system to:
    receive a first set of data packets comprising a video stream along with query from a user computing device associated with a user, said video stream along with said query pertaining to biometric features of the user, and receive, from a database, a knowledgebase comprising a set of potential identity information associated with said biometric features of said user and a plurality of information services associated with said user and said query;
    extract, by a query extraction engine, a first set of features from the received first set of data packets, said first set of features associated with a class of queries associated with the information service;
    extract, by a bio-metric collecting engine, a second set of features from the received first set of data packets, said second set of features corresponding to biometric features of said user;
    map, through a machine learning (ML) engine, any or a combination of extracted first and second set of features with said knowledgebase to identify and authenticate said user and said query;
    generate, through the ML engine, a trained model configured to process said query of said identified and authenticated user, and predict, from said plurality of information services, an information service associated with said identified and authenticated user query, and facilitate response corresponding to said information service to said identified and authenticated user query based on the trained model; and
    auto-generate, using the ML engine, the response by the bot application to said identified and authenticated user.

2. The system as claimed in claim 1, wherein the class of queries comprise a set of queries for information services, wherein the information services are generic information services and privileged information services.

3. The system as claimed in claim 1, wherein said query of the identified and authenticated user is received at client side of the executable bot application in the form of a second set of data packets from said user computing device, wherein said response that is mapped with the information service is transmitted in real-time in the form of a third set of data packets to said user computing device from server side of the bot application.

4. The system as claimed in claim 1, wherein said bot application is represented in the form of any or a combination of an animated character, a personality character, or an actual representation of a human operator.

5. The system as claimed in claim 1, wherein the system is configured to obtain a registration data based on a request from an unregistered user through respective user computing device, wherein login credentials are generated based on acknowledgement of the request and verification of the registration data, wherein the user enters the generated login credentials to access the system to obtain the information service associated with the user.

6. The system as claimed in claim 5, wherein the system stores consent of the user to store biometric features of the user for the class of queries for privileged information services, wherein upon receipt of the consent of the user the system stores the biometric features of the user, wherein the biometric features are stored based on the biometric scanners available in a user computing device associated with the user.

7. The system as claimed in claim 1, wherein the ML engine is configured to identify and authenticate said user through any or a combination of voice, password, OTP, facial feature, fingerprint, iris, DNA, skin, ear lobe, nose and at least two or more biometric feature stored in the database.

8. The system as claimed in claim 1, wherein the ML engine is configured to identify whether the query is for generic information services or privileged information services, wherein the ML engine checks whether the consent of user is available to access the privileged information services.

9. The system as claimed in claim 1, wherein the ML engine is configured to apply and identify one or more authentication modules based on a predefined set of configuration parameters associated with the plurality of information services corresponding to the said query generated by the user.

10. The system as claimed in claim 1, wherein the executable bot application is through any or a combination of IVR, Native Dialler and OTT route.

11. The system as claimed in claim 1, wherein the ML engine is configured to change authentication module based on any or a combination of said query generated by the user and said user equipment and wherein the change of the authentication module corresponds to upgradation or down gradation of said authentication module having said biometric features.

12. The system as claimed in claim 1, wherein the ML engine is configured to receive a query in the form of any or a combination of text, audio and video and wherein the response associated with the information service corresponding to the query received by the ML engine is provided in the form of text, audio and video.

13. The system as claimed in claim 1, wherein the ML engine is configured with language processing engines to receive said query in any language and provide said response corresponding to said query in any language.

14. A method for authentication on the bot application, said method comprising:
    receiving a first set of data packets comprising a video stream along with query from a user computing device associated with a user, said video stream along with said query pertaining to biometric features of the user, and receive, from a database, a knowledgebase comprising a set of potential identity information associated with said biometric features of said user and a plurality of information services associated with said user and said query;

extracting, by a query extraction engine, a first set of features from the received first set of data packets, said first set of features associated with a class of queries associated with the information service;

extracting, by a biometric collecting engine, a second set of features from the received first set of data packets, said second set of features corresponding to biometric features of said user;

mapping, through a machine learning (ML) engine, any or a combination of extracted first and second set of features with said knowledgebase to identify and authenticate said user and said query;

generating, through the ML engine, a trained model configured to process said query of said identified and authenticated user, and predict, from said plurality of information services, an information service associated with said identified and authenticated user query, and facilitate response corresponding to said information service to said identified and authenticated user query based on the trained model; and auto-generating, using the ML engine, the response by the bot application to said identified and authenticated user.

15. The method as claimed in claim 14, wherein the class of queries comprise a set of queries for information services, wherein the information services are generic information services and privileged information services.

16. The method as claimed in claim 14, wherein said query of the identified and authenticated user is received at client side of the executable bot application in the form of a second set of data packets from said user computing device, and wherein said response that is mapped with the information service is transmitted in real-time in the form of a third set of data packets to said user computing device from server side of the bot application.

17. The method as claimed in claim 14, wherein said bot application is represented in the form of any or a combination of an animated character, a personality character, or an actual representation of a human operator.

18. The method as claimed in claim 14, wherein the method is configured to obtain a registration data based on a request from an unregistered user through respective user computing device, wherein login credentials are generated based on acknowledgement of the request and verification of the registration data, wherein the user enters the generated login credentials to access the method to obtain the information service associated with the user.

19. The method as claimed in claim 18, wherein the method stores consent of the user to store biometric features of the user for the privileged set of queries, wherein upon receipt of the consent of the user the user stores the biometric features of the user, wherein the biometric features are stored based on the biometric scanners available in a user computing device associated with the user.

20. The method as claimed in claim 14, wherein the ML engine is configured to identify and authenticate said user through any or a combination of voice, password, OTP, facial feature, fingerprint, iris, DNA, skin, ear lobe, nose and at least two or more biometric feature stored in the database.

21. The method as claimed in claim 14, wherein the ML engine is configured to identify whether the query is for generic information services or privileged information services, wherein the ML engine checks whether the consent of user is available to access the privileged information services.

22. The method as claimed in claim 14, wherein the ML engine is configured to apply and identify one or more authentication modules based on a predefined set of configuration parameters associated with the plurality of information services corresponding to the said query generated by the user.

23. The method as claimed in claim 14, wherein the executable bot application is through any or a combination of IVR, Native Dialler and OTT route.

24. The method as claimed in claim 14, wherein the ML engine is configured to change authentication module based on any or a combination of said query generated by the user and said user equipment and wherein the change of the authentication module corresponds to upgradation or down gradation of said authentication module having said biometric features.

25. The method as claimed in claim 14, wherein the ML engine is configured to receive a query in the form of any or a combination of text, audio and video and wherein the response associated with the information service corresponding to the query received by the ML engine is provided in the form of text, audio and video.

26. The method as claimed in claim 14, wherein the ML engine is configured with language processing engines to receive said query in any language and provide said response corresponding to said query in any language.

* * * * *